No. 825,829. PATENTED JULY 10, 1906.
T. HEATH.
CASTRATING APPLIANCE.
APPLICATION FILED NOV. 28, 1904.

Witnesses
H. M. Kuehne
John A. Percival

Inventor
Thomas Heath
Richardson
Attorneys

UNITED STATES PATENT OFFICE.

THOMAS HEATH, OF NGATIMOTI, NEW ZEALAND.

CASTRATING APPLIANCE.

No. 825,829.  Specification of Letters Patent.  Patented July 10, 1906.

Application filed November 28, 1904. Serial No. 234,597.

*To all whom it may concern:*

Be it known that I, THOMAS HEATH, a subject of the King of Great Britain, residing at Ngatimoti, in the Province of Nelson, in the Colony of New Zealand, have invented a new and useful Castrating Appliance; and I do hereby declare the following to be a full, clear, and exact description of the same.

This invention relates to an improved appliance for use specially in castrating lambs, and it has been designed in order to render unnecessary the use of the operator's teeth, but at the same time to provide an appliance which in operation shall work similarly to the teeth.

The appliance devised consists of a pair of jaws that are mounted on pivoted arms provided with handles, by operating which the jaws may be freed from or caused to engage with each other. These jaws are formed of arched shape in plan and are provided with blunt teeth on their adjacent faces. Each jaw is provided with two rows of teeth, one extending along each edge thereof, and a depression is formed in the face of the jaw between the rows of teeth. The teeth are so arranged on the jaws that when such jaws are closed together those on one jaw shall fit between those on the other jaw, so as thus to give an effective grip.

Figure 1:
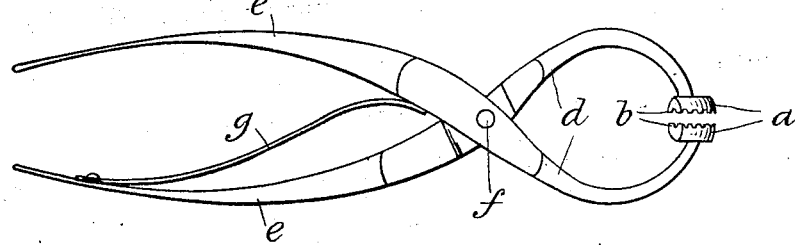
Figure 2:
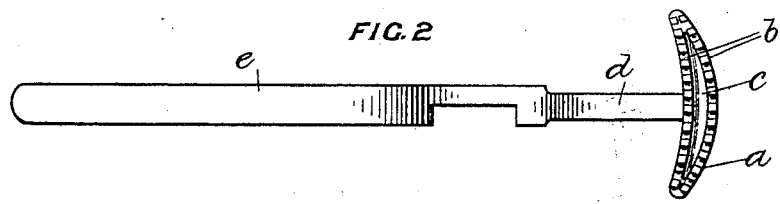
Figure 3:
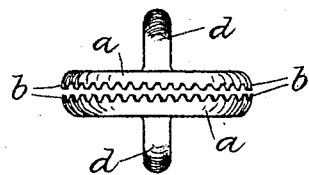

In the accompanying drawings, Figure 1 is a side elevation of the appliance. Fig. 2 is a plan of one of the jaws and its handle. Fig. 3 is an end view of the jaws.

$a$ represents the jaws, which are formed of a plate bent or shaped into arched form in plan, as shown in Fig. 2, the outer edge being preferably of an arc a smaller radius than the inner edge. Upon the face of each jaw are the rows of teeth $b$, which extend one along each edge thereof. These teeth are made of any desired form, but preferably of truncated pyramidal shape. A depression $c$ is thus formed in the face of the jaw between the rows of teeth. The jaws are secured to the ends of bowed arms $d$, which are formed with handle extensions $e$ and are pivoted together at $f$, so as to resemble pincers in form. A flat spring $g$ serves to keep the jaws $a$ normally apart. The teeth of the two jaws will dovetail into each other when they are closed.

In operation the animal's purse is first slit in the usual manner and it is seized between the jaws $a$ at the back. The jaws are tightly closed and the appliance is pulled outward, so as to press the testicles out through the slit in the purse. The teeth dovetailing into one another and the depressions between the rows of teeth will insure that a firm grip will be obtained by the jaws.

What I claim as my invention, and desire to secure by Letters Patent, is—

A castrating appliance composed of a pair of plates, each plate being bent into arched form in plan, the outer edge being of an arc a smaller radius than the inner edge, such plates having teeth upon their adjacent faces, such teeth being arranged in rows along both edges of the plates, said rows of teeth forming a depression between them and bowed arms to which said plates are connected, said arms being pivoted together.

In testimony whereof I have signed this specification in the presence of two subscribing witnesses.

THOMAS HEATH.

Witnesses:
 W. ALEXANDER,
 M. A. MARCHANT.